US008699835B2

(12) United States Patent
Ouyang et al.

(10) Patent No.: US 8,699,835 B2
(45) Date of Patent: Apr. 15, 2014

(54) PHOTONIC CRYSTAL FOUR-PORT BASED ON COUPLING OF MAGNETO-OPTICAL CAVITIES

(75) Inventors: Zhengbiao Ouyang, Guangdong (CN); Qiong Wang, Guangdong (CN)

(73) Assignee: Shenzhen University, Shenzhen (CN)

( * ) Notice: Subject to any disclaimer, the term of this patent is extended or adjusted under 35 U.S.C. 154(b) by 97 days.

(21) Appl. No.: 13/503,401

(22) PCT Filed: Nov. 29, 2010

(86) PCT No.: PCT/CN2010/079227
§ 371 (c)(1),
(2), (4) Date: Apr. 23, 2012

(87) PCT Pub. No.: WO2011/072572
PCT Pub. Date: Jun. 23, 2011

(65) Prior Publication Data
US 2012/0251048 A1    Oct. 4, 2012

(30) Foreign Application Priority Data

Dec. 14, 2009  (CN) .......................... 2009 1 0188885

(51) Int. Cl.
*G02B 6/26* (2006.01)
*G02B 6/293* (2006.01)
(52) U.S. Cl.
CPC *G02B 6/264* (2013.01); *G02B 6/26* (2013.01); *G02B 6/29395* (2013.01)
USPC .......................................................... 385/27
(58) Field of Classification Search
USPC ................... 385/14, 24, 27, 37, 147
See application file for complete search history.

(56) References Cited

U.S. PATENT DOCUMENTS

| 8,254,745 B2 * | 8/2012 | Nakada et al. ............... 385/141 |
| 2008/0267557 A1 * | 10/2008 | Wang et al. ................... 385/16 |
| 2012/0218619 A1 * | 8/2012 | Inoue et al. ................... 359/263 |
| 2012/0243844 A1 * | 9/2012 | Ouyang et al. ............... 385/130 |

FOREIGN PATENT DOCUMENTS

| CN | 101499616 A | 8/2009 |
| CN | 101533126   | 9/2009 |
| CN | 101571657 A | 11/2009 |
| CN | 101788727 A | 7/2010 |

* cited by examiner

Primary Examiner — Akm Enayet Ullah
(74) Attorney, Agent, or Firm — Jackson IPG PLLC

(57) ABSTRACT

The invention relates to a photonic crystal four-port circulator based on the coupling of magneto-optical cavities, which comprises two same magneto-optical cavities and three waveguides which are symmetrically distributed on the periphery of each magneto-optical cavity, wherein two waveguides connected with the magneto-optical cavities respectively are in a "v-shaped" arrangement, thereby guaranteeing that waveguides which are connected with the left sides of the two magneto-optical cavities are parallel to each other and waveguides which are connected with the right sides of the two magneto-optical cavities are parallel to each other as well and achieving the high-efficiency transmission in the case of the coupling of the magneto-optical cavities. The circulator provided by the invention utilizes the optical activity of the magneto-optical cavities to realize the rotation of the mode pattern of electromagnetic fields in the cavities, achieves the light transmission and isolation effects on different waveguides.

9 Claims, 3 Drawing Sheets

PHOTONIC CRYSTAL FOUR-PORT BASED ON COUPLING OF MAGNETO-OPTICAL CAVITIES

FIELD OF THE INVENTION

The invention relates to the fields of photonic crystal devices, magneto-optical technology, etc., in particular to a photonic crystal four-port circulator based on the coupling of magneto-optical cavities.

BACKGROUND OF THE INVENTION

Optical circulator is an important optical device with the anti-interference function in integrated optics. The optical circulator can realize circular light transmission in single rotational direction among a plurality of ports, so that incident signals can smoothly pass through while reflective signals can be isolated. Due to the characteristic, the optical circulator can greatly reduce the mutual crosstalk of reflective light of devices in an integrated optical circuit and is highly favorable to improve the system stability. The traditional optical circulator is mainly based on the block structure of magneto-optical materials and has the disadvantages of large volume and difficulty in integration with other optical devices. The disadvantages greatly limit the application of optical circulators in a new generation of optical devices.

The introduction of the concept of photonic crystal and the research and development of photonic crystals provide new thoughts and methods for the implementation of easily integrated small-size magneto-optical circulators. Photonic crystal is a novel artificial material formed by the periodic or quasi-periodic arrangement of different dielectrics. One important characteristic of the photonic crystal is the existence of photonic forbidden band, and waves within the corresponding forbidden frequency band cannot be propagated in the crystal. The control and operation of photons can be realized by the introduction of defects in the photonic crystal by utilizing the band gap effect. Devices with different functions, based on the unique optical property of the photonic crystal, have been widely developed and applied. For example, photonic crystal lasers, photonic crystal wavelength division multiplexer/demultiplexer, photonic crystal resonant cavities and photonic crystal switches. The devices have immeasurable application prospects in novel photonic crystal devices.

The photonic crystal circulator designed by utilizing the magneto-optical effect has the advantages of compact structure, flexible design and very large scale in integration, and has potential application value in the aspect of improving the signal stability of a photonic crystal device integrated system. However, the study of photonic crystal magneto-optical circulators is still in the preliminary stage, and the photonic crystal magneto-optical circulators all adopt the structural design based on a single photonic crystal magneto-optical cavity. Due to the single-cavity nature in the structure, these photonic crystal magneto-optical circulators have certain limitation in the aspect of port expansion.

SUMMARY OF THE INVENTION

The technical problem to be solved by the invention is to provide a photonic crystal four-port circulator based on the coupling of magneto-optical cavities to achieve the optimum transmission efficiency and high isolation of light by coupling the magneto-optical cavities through reasonable arrangement of waveguide connection between two magneto-optical cavities, thereby realizing circular light transmission in single rotational direction in a photonic crystal four-port circulator.

The technical proposal as adopted by the invention to solve the technical problem is as follows: the invention relates to a photonic crystal four-port circulator based on the coupling of magneto-optical cavities, wherein a photonic crystal is formed by triangularly and symmetrically arranged first air columns periodically distributed in a background dielectric material. The photonic crystal four-port circulator based on the coupling of the magneto-optical cavities also comprises two same magneto-optical cavities, namely a first magneto-optical cavity and a second magneto-optical cavity, a first waveguide, a second waveguide and a third waveguide which are symmetrically distributed on the periphery of the first magneto-optical cavity, and a fourth waveguide, a fifth waveguide and a sixth waveguide which are symmetrically distributed on the periphery of the second magneto-optical cavity, wherein the third waveguide and the fourth waveguide which are connected with the first magneto-optical cavity and the second magneto-optical cavity respectively, in the middle, are in a "v-shaped" arrangement; the second waveguide and the fourth waveguide are parallel to each other; the third waveguide and the fifth waveguide are parallel to each other as well; two second air columns are arranged at the connecting region between the first magneto-optical cavity and the first waveguide, between the first magneto-optical cavity and the second waveguide, and between the first magneto-optical cavity and the third waveguide respectively; two second air columns are also arranged at the connecting region between the second magneto-optical cavity and the fourth waveguide, between the second magneto-optical cavity and the fifth waveguide, and between the second magneto-optical cavity and the sixth waveguide respectively; the diameter of the second air columns is less than that of the first air columns; two rows of third air columns and fourth air columns with increasing diameter are arranged between the first waveguide and the second waveguide, between the first waveguide and the third waveguide, and between the second waveguide and the third waveguide, close to the first magneto-optical cavity, respectively; two rows of third air columns and fourth air columns with increasing diameter are also arranged between the fourth waveguide and the fifth waveguide, between the fourth waveguide and the sixth waveguide, and between the fifth waveguide and the sixth waveguide, close to the second magneto-optical cavity, respectively; the diameter of the fourth air columns is more than that of the third air columns; and the diameter of the third air columns is more than that of the first air columns.

In the invention, both fifth air columns and sixth air columns which are arranged up and down at the connecting position of the third waveguide and the fourth waveguide are moved upwards for half the lattice constant of the photonic crystal along the direction parallel to the first waveguide and the sixth waveguide.

In the invention, both the first magneto-optical cavity and the second magneto-optical cavity comprise a magneto-optical material column and six first air columns which are symmetrically distributed on the periphery of the magneto-optical material column; and the magneto-optical material column is formed by increasing the diameter of one first air column, filling it with magneto-optical material, and applying a magnetic field in the direction parallel to the axial line of the magneto-optical material column.

In the invention, the first waveguide, the second waveguide, the third waveguide, the fourth waveguide, the fifth waveguide and the sixth waveguide are all formed by filling the background dielectric material into a column of first air columns; and the waveguide length is at least three lattice constants of the photonic crystal.

In the invention, every two adjacent waveguides among the first waveguide, the second waveguide and the third waveguide which are symmetrically distributed on the periphery of the first magneto-optical cavity are at an included angle of 120 DEG; the axes of the first waveguide, the second waveguide and the third waveguide intersect at the center of the first magneto-optical cavity; every two adjacent waveguides among the fourth waveguide, the fifth waveguide and the sixth waveguide which are symmetrically distributed on the periphery of the second magneto-optical cavity are at an included angle of 120 DEG; and the axes of the fourth waveguide, the fifth waveguide and the sixth waveguide intersect at the center of the second magneto-optical cavity.

In the invention, the third waveguide and the fourth waveguide which are in a "v-shaped" arrangement have the same length; and the included angle between the two waveguides is 120 DEG.

In the invention, the cross sections of the first air columns, the second air columns, the third air columns, the fourth air columns, the fifth air columns, the sixth air columns and the two magneto-optical material columns in the photonic crystal can be circular, triangular, quadrilateral, pentagonal or hexagonal.

In the invention, the first air columns, the second air columns, the third air columns, the fourth air columns, the fifth air columns and the sixth air columns in the photonic crystal are dielectric columns made of materials with a low refractive index.

In the invention, gallium nitride material is selected as the background dielectric material of the photonic crystal, and bismuth iron garnet material is selected as the magneto-optical material for filling the first air columns.

Compared with the prior art, the photonic crystal four-port circulator based on the coupling of the magneto-optical cavities provided by the invention achieves the light transmission and isolation effects on different waveguides by utilizing the optical activity of the magneto-optical cavities, so as to successfully realize circular light transmission in single rotational direction among four ports. Moreover, the photonic crystal four-port circulator based on the coupling of the magneto-optical cavities provided by the invention achieves the effect that the waveguides on the left sides of the two magneto-optical cavities are parallel to each other and waveguides on the right sides of the two magneto-optical cavities are parallel to each other as well, through the reasonable arrangement of the waveguides connected with the magneto-optical cavities, so as to achieve the optimum transmission effect in the case of the coupling of the magneto-optical cavities. In addition, the photonic crystal four-port circulator based on the coupling of the magneto-optical cavities has a compact structure, can be easily integrated with other photonic crystal devices, and plays an important role in the isolation of reflected light signals and the improvement of the stable transmission of light signals in photonic crystal integrated devices.

DETAILED DESCRIPTION OF THE PREFERRED EMBODIMENTS

Further description is given to the invention according to the attached drawings and specific implementations.

Figure 1:
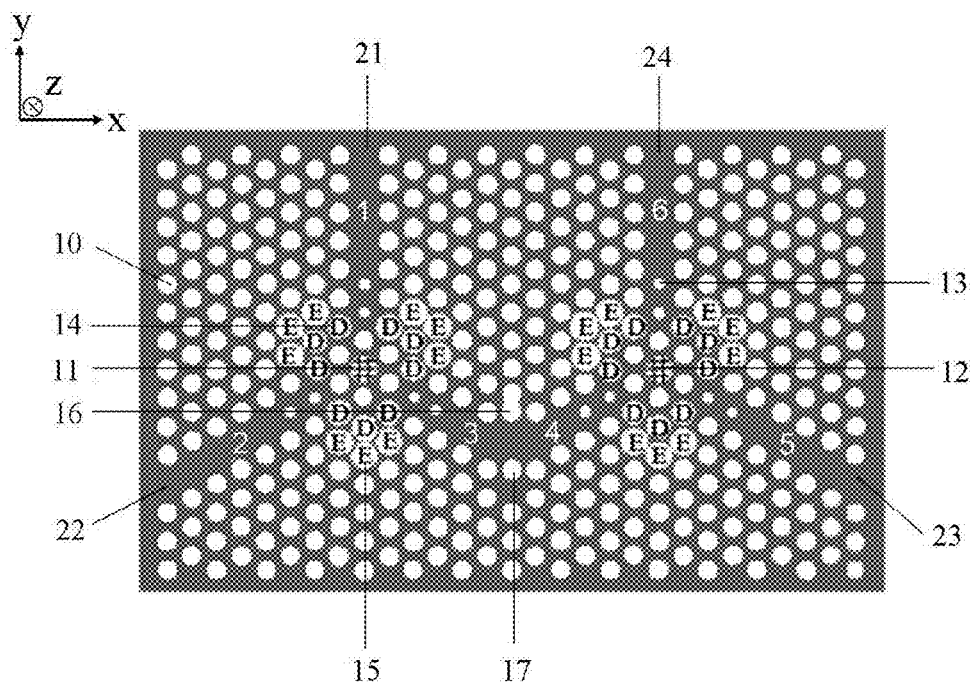
FIG. 1 is a schematic diagram of the two-dimensional photonic crystal four-port circulator provided by the invention, in which a first magneto-optical cavity and a second magneto-optical cavity are coupled.

As illustrated in FIG. 1, a two-dimensional photonic crystal is formed by first air columns 10 periodically distributed in a background dielectric material; the lattice constant a is 1 μm; and the first air columns 10 with the diameter d of 0.72 μm are in a triangular and symmetrical arrangement, namely the lines of centers of every three adjacent first air columns 10 form an equilateral triangle. Gallium nitride (GaN) material with a refractive index of 2.5 can be selected as the background dielectric material. As illustrated by the result calculated by the plane-wave expansion method, the dielectric-substrate-air-column type photonic crystal has wide TM polarized-wave (with the magnetic field in the z direction) photonic band gap. The band gap width is ranged from the normalized frequency $a/\lambda=0.307$ to $a/\lambda=0.418$, wherein $\lambda$ represents the optical wavelength.

In the photonic crystal, the diameter of two first air columns 10 (at intervals of five first air columns along the x-axis direction) is increased to 0.8 μm; the two first air columns 10 are filled with magneto-optical material and applied with a magnetic field in the direction parallel to the axial line of the first air columns 10 to form two same magneto-optical material columns (marked by meshline in FIG. 1); magneto-optical cavities, namely a first magneto-optical cavity 11 and a second magneto-optical cavity 12 are respectively formed by each magneto-optical material column and six first air columns 10 which is arranged on the periphery of and close to the magneto-optical material column; the first magneto-optical cavity 11 and the second magneto-optical cavity 12 are respectively connected with a third waveguide 3 and a fourth waveguide 4 which are in a "v-shaped" arrangement to form a coupling structure; the included angle of the "v-shaped" structure is 120 DEG, namely the included angle of the third waveguide 3 and the fourth waveguide 4 is 120 DEG; the first magneto-optical cavity 11 is also connected with the first waveguide 1 and the second waveguide 2; the second magneto-optical cavity 12 is also connected with the fifth waveguide 5 and the sixth waveguide 6; the first waveguide 1, the second waveguide 2, the third waveguide 3, the fourth waveguide 4, the fifth waveguide 5 and the sixth waveguide 6 are all formed by filling the background dielectric material into a line of first air columns 10; the first waveguide 1, the second waveguide 2 and the third waveguide 3 correspond to the first magneto-optical cavity 11; the fourth waveguide 4, the fifth waveguide 5 and the sixth waveguide 6 correspond to the second magneto-optical cavity 12; the axes of the first waveguide 1, the second waveguide 2 and the third waveguide 3 intersect at the center of the first magneto-optical cavity 11; the axes of the fourth waveguide 4, the fifth waveguide 5 and the sixth waveguide 6 intersect at the center of the second magneto-optical cavity 12; every two adjacent waveguides among three waveguides of each group are at an included angle of 120 DEG; the first waveguide 1 corresponds to a port 21; the second waveguide 2 corresponds to a port 22; the fifth waveguide 5 corresponds to a port 23; the sixth waveguide 6 corresponds to a port 24; the third waveguide 3 and the fourth waveguide 4 which are connected with the first magneto-optical cavity 11 and the second magneto-optical cavity 12 respectively are in a "v-shaped" arrangement; the second waveguide 2 and the fifth waveguide 4 which are respectively connected with the left sides of the first magneto-optical cavity 11 and the second magneto-optical cavity 12 are parallel to each other; and the third waveguide 3 and the fifth waveguide 5 which are respectively connected with the right sides of the first magneto-optical cavity 11 and the second magneto-optical cavity 12 are parallel to each other as well. In order to improve the coupling efficiency of the magneto-optical cavities and the waveguides, two second air columns 13 are arranged at the connecting region between the first magneto-optical cavity 11 and the first waveguide 1, between the first magneto-optical cavity 11 and the second waveguide 2, and between the first magneto-optical cavity 11 and the third waveguide 3, respectively; two second air columns 13 are also arranged at the connecting region between the second magneto-optical cavity 12 and the fourth waveguide 4, between the second magneto-optical cavity 12 and the fifth waveguide 5, and between the second magneto-optical cavity 12 and the sixth waveguide 6, respectively; and the diameter of the second air columns 13 is 0.36 µm.

After the application of the magnetic field in the direction (z axis) parallel to the axial line of the first air column 10, the dielectric parameters of the magneto-optical materials can be expressed by a three-dimensional tensor:

$$\bar{\varepsilon} = \begin{bmatrix} \varepsilon_{xx} & \varepsilon_{xy} & \varepsilon_{xz} \\ \varepsilon_{yx} & \varepsilon_{yy} & \varepsilon_{yz} \\ \varepsilon_{zx} & \varepsilon_{zy} & \varepsilon_{zz} \end{bmatrix} = \begin{bmatrix} \varepsilon_0 & i\varepsilon_a & 0 \\ -i\varepsilon_a & \varepsilon_0 & 0 \\ 0 & 0 & \varepsilon_0 \end{bmatrix} \quad (1)$$

Wherein, the diagonal element $\in_o$ corresponds to the dielectric constant of the materials without an externally-applied magnetic field, and the nondiagonal element $\in_a$ corresponds to the magneto-optical effect intensity after the application of the external magnetic field. The magneto-optical effect generated in the magneto-optical cavities of the photonic crystal can enable eigenmodes supported by a point defect cavity to form mutual coupling, thereby resulting in the rotational variation of the distribution modes of electromagnetic fields in the magneto-optical cavities, namely the optical activity of the magneto-optical cavities of the photonic crystal. When light with specific wavelength is fed into one waveguide of the magneto-optical cavity, due to the optical activity of the magneto-optical cavity, the field distribution patterns as well as the wave vector of the light in the cavity rotate an angle. The angle is so set that the wave vector of the light in the cavity is parallel to wave-guiding direction of one waveguide, so that the light from the input port is transmitted only into this waveguide, namely the waveguide with its wave-guiding direction parallel to the wave vector of the light in the cavity is in the light transmission state, while the other two waveguides with their wave-guiding direction different from the wave vector of light in the cavity is in the light isolation state. Bismuth iron garnet (Bismuth Iron Garnet, BIG) material can be selected as the magneto-optical material for filling the first air columns. The diagonal element $\in_0$ and the non-diagonal element $\in_a$ of the materials are 6.25 and 0.0517, respectively.

Figure 2:
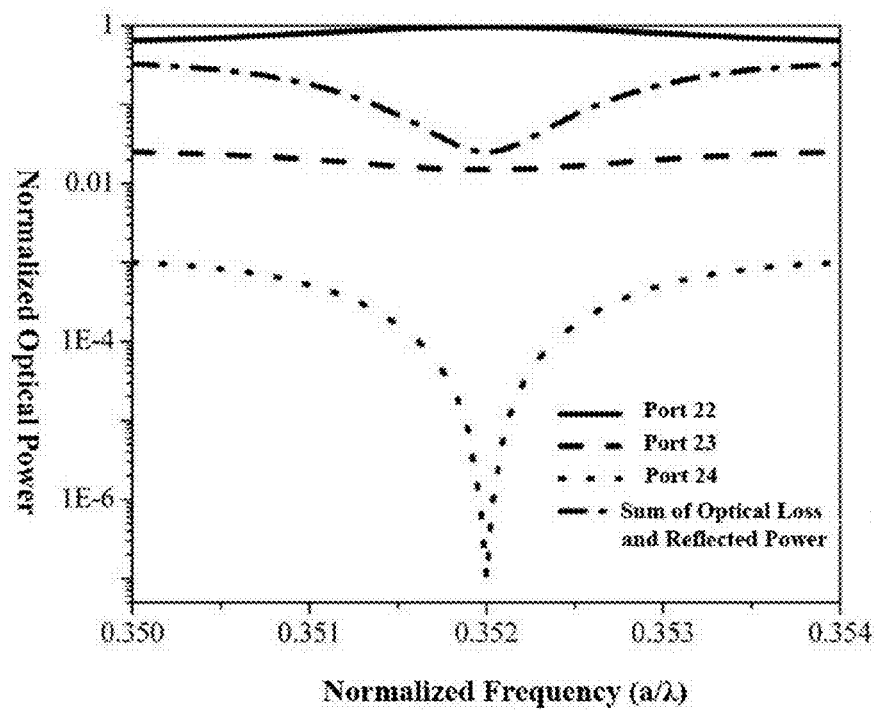
FIG. 2 is a spectrogram of the photonic crystal four-port circulator based on the coupling of the magneto-optical cavities, provided by the invention, wherein a first port 21 is set to be a light input port; the solid line represents the light power at the second (transmission) port 22; the dashed line represents the light power at the third (isolation) port 23; the dot line represents the light power at the fourth (isolation) port 24; and the pecked line represents the power summation of optical loss and reflected light.

In order to improve the transmission efficiency of the waveguides in the photonic crystal circulator and reduce the interference among the waveguides, as illustrated in FIG. 1, two rows of third air columns 14 (air columns D) and fourth air columns 15 (air columns E) with increasing diameter are arranged between the first waveguide 1 and the second waveguide 2, the first waveguide 1 and the third waveguide 3, and the second waveguide 2 and the third waveguide 3, close to the first magneto-optical cavity 11, respectively; and two rows of third air columns 14 and fourth air columns 15 with increasing diameter are also arranged between the fourth waveguide 4 and the fifth waveguide 5, the fourth waveguide 4 and the sixth waveguide 6, and the fifth waveguide 5 and the sixth waveguide 6, close to the second magneto-optical cavity, respectively. Light is incident from the first port 21 of the first waveguide 1, and detectors are respectively arranged at the first port 21, the second port 22, the third port 23 and the fourth port 24 to obtain corresponding light power, wherein the detector at the first port 21 measures the power of reflected light back from the first port 21, and the detectors at the second port 22, the third port 23 and the fourth port 24 measure the powers of transmitted light to the second port 22, the third port 23 and the fourth port 24, respectively. The optimum spectrogram, obtained by adjusting the diameters of the third air columns 14 and the fourth air columns 15 in FIG. 1, is illustrated in FIG. 2. It turns out that: when the working frequency of the circulator is a/λ=0.352, the light power at the second output port 22 achieves the maximum of 96%; the light power at the third (isolation) port 23 and the fourth (isolation) port 24 are 1.5% and 0.0001%, respectively; and the sum of optical loss and reflected light power achieves the minimum of about 2.5% accordingly. The optimized diameters of the third air columns 14 and the fourth air columns 15 are 0.78 µm and 0.86 µm, respectively. Due to the symmetry of the structure, the optimized results are also applicable to the case of light incident from the third port 23 of the fifth waveguide 5.

Figure 3:
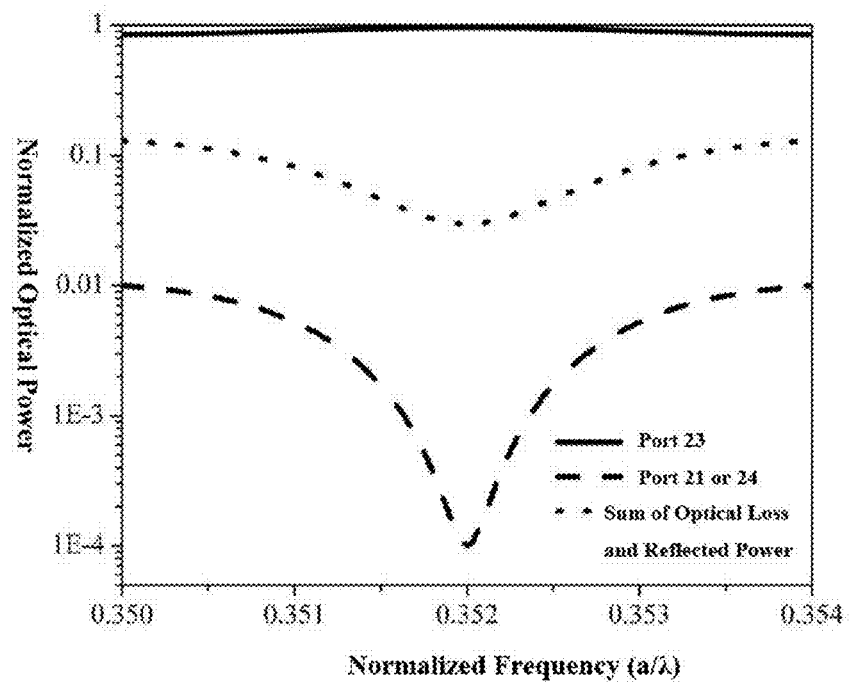
FIG. 3 is a spectrogram of the photonic crystal four-port circulator based on the coupling of the magneto-optical cavities, provided by the invention, wherein the second port 22 is set to be a light input port; the solid line represents the light power at the third (transmission) port 23; the dashed line represents the light power at the first (isolation) port 21 or the fourth (isolation) port 24; and the dot line represents the power summation of optical loss and reflected light.

In order to reduce the loss at the corner connecting the third waveguide 3 and the fourth waveguide 4 which are in a "v-shaped" arrangement and connected with the first magneto-optical cavity 11 and the second magneto-optical cavity 12, respectively, the positions of the fifth air columns 16 and the sixth air columns 17, which are distributed up and down at the connecting position of the third waveguide 3 and the fourth waveguide 4, are adjusted. Light is incident from the second port 22, and detectors are respectively arranged at the first port 21, the second port 22, the third port 23 and the fourth port 24 to obtain the corresponding light power, wherein the detector at the second port 22 measures the power of light reflected from the second port 22, and the detectors at the first port 21, the third port 23 and the fourth port 24 measure the powers of transmitted light to the first port 21, the third port 23 and the fourth port 24, respectively. The optimum spectrogram, obtained by adjusting the positions of the fifth air columns 16 and the sixth air columns 17, is illustrated in FIG. 3. It turns out that: the fifth air columns 16 and the sixth air columns 17, which are distributed up and down at the connecting position of the third waveguide 3 and the fourth waveguide 4, are all moved upwards for half the lattice constant of the photonic crystal, namely a/2, along the direction (y axis) parallel to the first waveguide 1 and the sixth waveguide 6; the light power at the third output port 23 achieves the maximum of 97% at the normalized frequency a/λ=0.352; the light power at both the first (isolation) port 21 and the fourth (isolation) port 24 is 0.01%; and the sum of optical loss and reflected power achieves the minimum of 2.98% accordingly.

The photonic crystal four-port circulator based on the coupling of the magneto-optical cavities, provided by the invention, realizes circular transmission of light in single rotational direction from the first port 21 to the second port 22, from the second port 22 to the third port 23, and from the third port 23 to the fourth port 24. The high-efficiency transmission and high light isolation effects are achieved through match or mismatch of modes in the magneto-optical cavities and that in the waveguides. The working performances of the photonic crystal four-port circulator based on the coupling of the magneto-optical cavities is verified by the use of the finite-difference time-domain (FDTD) method to simulate the electric field intensity distribution of the photonic crystal circulator, and at one of the ports in the structure adopts Gaussian continuous light sources. In the simulations, boundary condition of perfect matched absorbing layer is applied, and the incident light is of single frequency. The operating wavelength of the circulator is λ=(1/0.352)μm, namely 2.841 μm.

Figure 4:
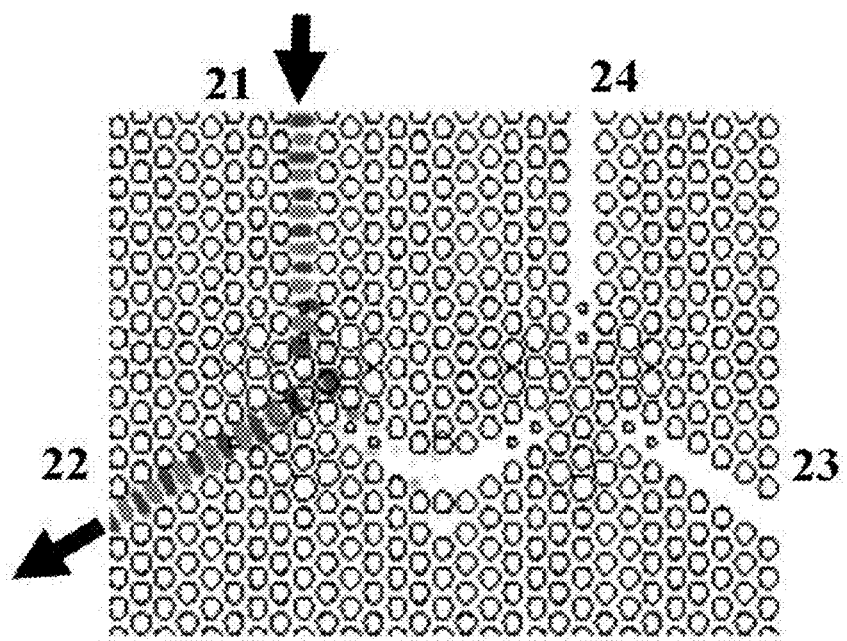
FIG. 4 is a light transmission diagram of the photonic crystal four-port circulator based on the coupling of the magneto-optical cavities, provided by the invention, wherein the first port 21 is a light input port; the second port 22 is a light output port; and the third port 23 and the fourth port 24 are light isolating ports.

As illustrated in FIG. 4, light is launched into the first port 21. Due to the optical activity of the magneto-optical cavities, the wave vector of the magnetic field in the first magneto-optical cavity 11 is rotated to the direction which is different from the wave-guiding direction of the third waveguide 3 but parallel to the wave-guiding direction of the second waveguide 2. Finally, the light is emitted from the second port 22 at which the light power is about 96% of the input power; and the third port 23 and the fourth port 24, at which the light powers are respectively 1.5% and 0.0001% of the input power, are in the isolation state. In this case, only the first magneto-optical cavity 11 is in the operating state. The ratio of the light power at the second (transmission) port 22 to that at the third (isolation port) 23 and the ratio of the light power at the second (transmission) port 22 to that at the fourth (isolation) port 24 are 18.1 dB and 59.8 dB, respectively.

Figure 5:
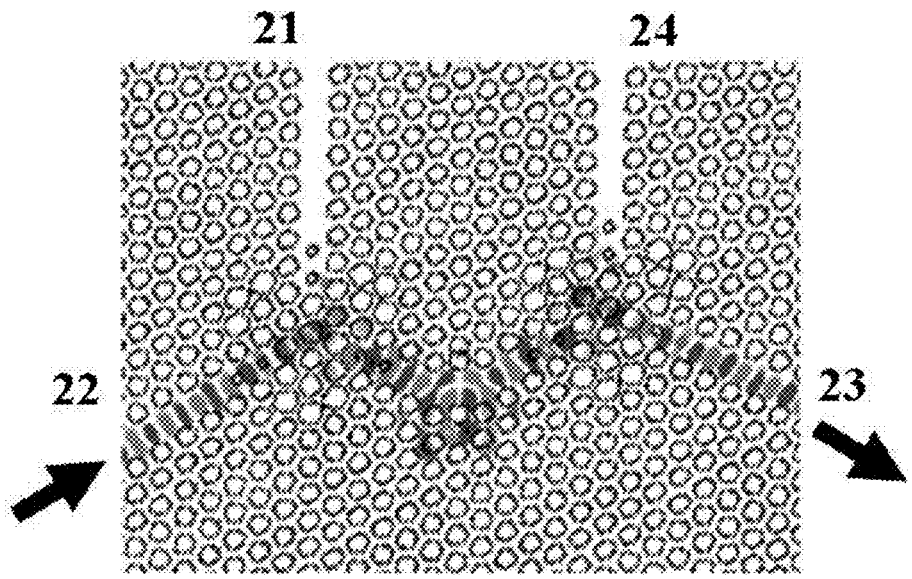
FIG. 5 is a light transmission diagram of the photonic crystal four-port circulator based on the coupling of the magneto-optical cavities, provided by the invention, wherein the second port 22 is a light input port; the third port 23 is a light output port; and the first port 21 and the fourth port 24 are light isolating ports.

As illustrated in FIG. 5, light is incident from the second port 22; both the first magneto-optical cavity 11 and the second magneto-optical cavity 12 are in the operating state herein; the light is finally emitted from the third port 23 at which the light power is about 97% of the input power; and both the first port 21 and the fourth port 24, at which the light powers are the same 0.01% of the input power, are in the isolation state. Moreover, the waveguides on the left sides of the first magneto-optical cavity 11 and the second magneto-optical cavity 12 are parallel to each other and the waveguides on the right sides of the magneto-optical cavity 11 and the second magneto-optical cavity 12 are parallel to each other as well, namely the second waveguide 2 and the fourth waveguide 4 are parallel to each other and the third waveguide 3 and the fifth waveguide 5 are parallel to each other as well. Due to the parallelism, it is guaranteed that the first magneto-optical cavity 11 and the second magneto-optical cavity 12 are in the high-efficiency coupling state. The ratio of the light power at the third (transmission) port 23 to that at the first (isolation) port 21 and the ratio of the light power at the third (transmission) port 23 to that at the fourth (isolation) port 24 are both 39.9 dB.

Figure 6:
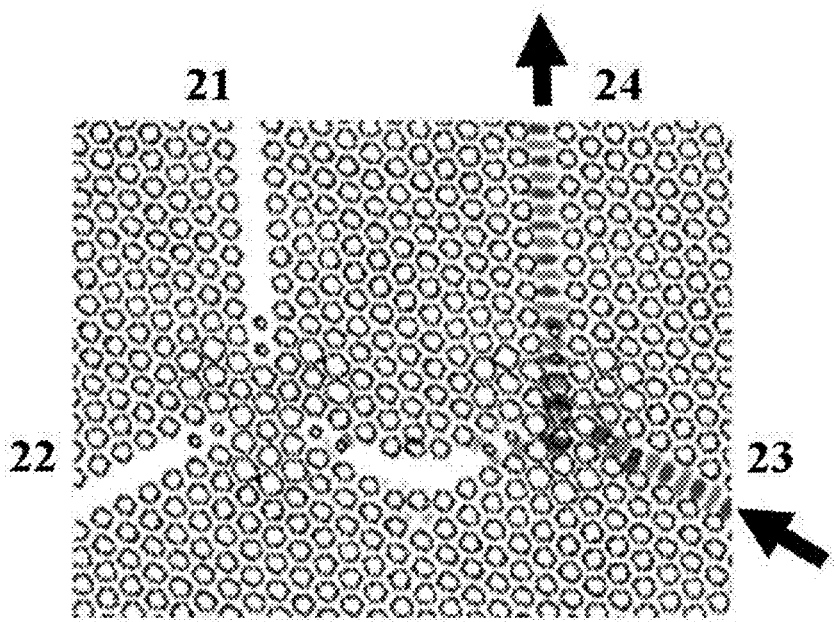
FIG. 6 is a light transmission diagram of the photonic crystal four-port circulator based on the coupling of the magneto-optical cavities, provided by the invention, wherein the third port 23 is a light input port; the fourth port 24 is a light output port; and the first port 21 and the second port 22 are light isolating ports.

As illustrated in FIG. 6, light is incident from the third port 23. Due to the optical activity of the magneto-optical cavities, the wave vector of the magnetic field in the second magneto-optical cavity 12 is rotated to the direction which is deviated from the fourth waveguide 4 and parallel to the sixth waveguide 6. Finally, the light is emitted from the fourth port 24 at which the light power is about 97% of the input power; and the first port 21 and the second port 22, at which the light powers are respectively 0.0001% and 1.5% of the input power, are in the isolation state. In this case, only the second magneto-optical cavity 12 is in the operating state. The ratio of the light power at the fourth (transmission) port 24 to that at the first (isolation) port 21 and the ratio of the light power at the fourth (transmission) port 24 to that at the second (isolation) port 22 are 59.8 dB and 18.1 dB, respectively.

In the implementation, the triangular and symmetrical arrangement of the first air columns particularly refers to that the line of centers of every three adjacent first air columns in the array forms an equilateral triangle.

In the implementation, the cross sections of the first air columns, the second air columns, the third air columns, the fourth air columns, the fifth air columns, the sixth air columns and the magneto-optical material column in the photonic crystal can be circular, triangular, quadrilateral, pentagonal, hexagonal and so on.

In the implementation, the lengths of the first waveguide, the second waveguide, the third waveguide, the fourth waveguide, the fifth waveguide and the sixth waveguide are at least more than three lattice constants of the photonic crystal. The waveguide length can be increased in light of actual needs, without changing the function of circular transmission of light in single rotational direction in the circulator.

In the implementation, the optical activity specifically refers to that: after a point defect magneto-optical cavity is formed by increasing the diameter of a single air column in the photonic crystal, filling it with the magneto-optical material, and applying a magnetic field in the direction parallel to the longitudinal axis of the magneto-optical material column, the magneto-optical effect can enable the mutual coupling of the eigenmodes supported by point defects, thereby resulting in the rotational variation of the field distribution pattern and the wave vector of light in the cavity.

In the implementation, the second air columns 13 arranged at the connecting region between the magneto-optical cavities and the waveguides have dual functions: when the waveguides connected with the second air columns 13 are in the light transmission state, the second air columns 13 have the function of coupling the magneto-optical cavities and the waveguides; and when the waveguides connected with the second air columns 13 are in the light isolation state, the second air columns 13 have the function of isolating the magneto-optical cavities and the waveguides.

In the implementation, the repeated arrangement of two rows of third air columns 14 and fourth air columns 15 with increasing diameter between every two waveguides close to the cavity has the advantages of reducing the interference between the waveguides on one hand and improving the transmission efficiency of the waveguides on the other hand.

In the implementation, when light is transmitted from the first port 21 to the second port 22, only the first magneto-optical cavity 11 is in the operating state, with the first waveguide 1 and the second waveguide 2 in the light transmission state and the third waveguide 3, the fourth waveguide 4, the fifth waveguide 5 and the sixth waveguide 6 in the light isolation state; when light is transmitted from the second port 22 to the third port 23, both the first magneto-optical cavity 11 and the second magneto-optical cavity 12 are in the operating state, with the second waveguide 2, the third waveguide 3, the fourth waveguide 4 and the fifth waveguide 5 in the light transmission state and the first waveguide 1 and the sixth waveguide 6 in the light isolation state; and when light is transmitted from the third port 23 to the fourth port 24, only the second magneto-optical cavity 12 is in the operating state, with the fifth waveguide 5 and the sixth waveguide 6 in the light transmission state and the first waveguide 1, the second waveguide 2, the third waveguide 3 and the fourth waveguide 4 in the light isolation state. The optimum operating wavelength of the circulator is a(1/0.352) μm, namely 2.841aμm=2.841 μm.

The photonic crystal four-port circulator provided by the invention is not limited to the above implementations. It shall be understood by those skilled in the art that the photonic crystal four-port circulator provided by the invention is applicable to any electromagnetic wave band such as the microwave band, the millimeter wave band, the terahertz wave band, the infrared wave band and the visible light wave band according to the proportional scaling principle of the photonic crystal, namely the operating wavelength of the circulator is in proportional relationship with the parameters such as the lattice constant of the photonic crystal, the dimension of the background dielectric material in the system, the dimensions of the first air columns, the second air columns, the third air columns, the fourth air columns, the fifth air columns and the sixth air columns, and the dimension of the magneto-optical material column. The specific implementation is as follows: the operating wavelength $\lambda_1$ is given; the lattice constant $a_1 = a(\lambda_1/\lambda) = 0.352\lambda_1$ is determined accordingly, wherein a and $\lambda$ respectively represents the lattice constant and the operating wavelength in the embodiment; and the parameters such as the lattice constant of the photonic crystal, the dimension of the background dielectric material in the system, the dimensions of the first air columns, the second air columns, the third air columns, the fourth air columns, the fifth air columns and the sixth air columns, and the dimension of the magneto-optical material column are subjected to proportional scaling to $(\lambda_1/\lambda)$ times of those in the embodiment. The given operating wavelength is $\lambda_1 = 1.550$ μm; the corresponding lattice constant $a_1$ of the wavelength is 0.546 μm; the cross section diameter of the first air columns is 0.393 μm; the diameter of the magneto-optical material columns 16 is 0.437 μm; the diameters of the second air columns, the third air columns and the fourth air columns are 0.197 μm, 0.426 μm and 0.470 μm, respectively; and the diameters of both the fifth air columns and the sixth air columns are 0.393 μm. The circulator has circular transmission function in single rotational direction under the operating wavelength of 1.550 μm, namely: light incident from the first port 21 is emitted from the second port 22 at which the light power is about 96% of the input power, with the third port 23 and the fourth port 24, at which the light powers are respectively 1.5% and 0.0001% of the input power, being in the isolation state, and with only the first magneto-optical cavity 11 in the operating state; light incident from the second port 22 is emitted from the third port 23 at which the light power is about 97% of the input power, with the first port 21 and the fourth port 24, at which the light powers are the same 0.01% of the input power, and with both the first magneto-optical cavity 11 and the second magneto-optical cavity 12 in the operating state; and light incident from the third port 23 is emitted from the fourth port 24 at which the light power is about 97% of the input power, with the first port 21 and the second port 22, at which the light powers are respectively 0.0001% and 1.5% of the input power, being in the isolation state, and with only the second magneto-optical cavity 12 in the operating state.

The above is only the preferred embodiments of the invention. The equivalent variations and modifications made within the scope of the claims of the invention shall be all included in the claims of the invention.

What is claimed is:
1. A photonic crystal four-port circulator based on the coupling of magneto-optical cavities,
wherein,
said photonic crystal is formed by triangularly and symmetrically, namely in equilateral triangle, arranged first air columns periodically distributed in a background dielectric material;
said photonic crystal four-port circulator is based on the coupling of said magneto-optical cavities comprising
two same said magneto-optical cavities, namely a first magneto-optical cavity and a second magneto-optical cavity, a first waveguide,
a second waveguide and a third waveguide symmetrically distributed on the periphery of said first magneto-optical cavity, and
a fourth waveguide, a fifth waveguide and a sixth waveguide symmetrically distributed on the periphery of said second magneto-optical cavity,
wherein said third waveguide and said fourth waveguide are in a "v-shaped" arrangement and are connected with said first magneto-optical cavity and said second magneto-optical cavity, respectively;
said second waveguide and said fourth waveguide are parallel to each other;
said third waveguide and said fifth waveguide are parallel to each other as well;
two second air columns are arranged at the connecting regions between said first magneto-optical cavity said first waveguide, between said first magneto-optical cavity and said second waveguide, and between said first magneto-optical cavity and said third waveguide, respectively;
two said second air columns also arranged at the connecting regions between said second magneto-optical cavity and said fourth waveguide, between said second magneto-optical cavity and said fifth waveguide, and between said second magneto-optical cavity and said sixth waveguide, respectively;
the diameter of said second air columns is less than that of said first air columns;
two rows of third air columns and fourth air columns with increasing diameter are arranged between said first waveguide and said second waveguide, between said first waveguide and said third waveguide, and between said second waveguide and said third waveguide, close to said first magneto-optical cavity, respectively;
two rows of said third air columns and said fourth air columns with increasing diameter are also arranged between said fourth waveguide and said fifth waveguide, between said fourth waveguide and said sixth waveguide, and between said fifth waveguide and said sixth waveguide, close to said second magneto-optical cavity, respectively;

the diameter of said fourth air columns is greater than that of said third air columns; and the diameter of said third air columns is greater than that of said first air columns.

2. The photonic crystal four-port circulator based on the coupling of said magneto-optical cavities according to claim 1, wherein both fifth air columns and sixth air columns arranged up and down at the connecting position of said third waveguide and said fourth waveguide are moved upwards for half the lattice constant of said photonic crystal along the direction parallel to said first waveguide and said sixth waveguide.

3. The photonic crystal four-port circulator based on the coupling of said magneto-optical cavities according to claim 2, wherein both said first magneto-optical cavity and said second magneto-optical cavity comprise a magneto-optical material column and six said first air columns which are symmetrically distributed on the periphery of said magneto-optical material column; and said magneto-optical material column is formed by increasing the diameter of said first air column in said photonic crystal, filling said first air column with magneto-optical material, and applying a magnetic field in the direction parallel to the axis of said magneto-optical material column.

4. The photonic crystal four-port circulator based on the coupling of said magneto-optical cavities according to claim 1, wherein said first waveguide, said second waveguide, said third waveguide, said fourth waveguide, said fifth waveguide and said sixth waveguide are all formed by filling said background dielectric material into a column of said first air columns;

and the waveguide length is at least three lattice constants of said photonic crystal.

5. The photonic crystal four-port circulator based on the coupling of said magneto-optical cavities according to claim 1, wherein every two adjacent waveguides among said first waveguide, said second waveguide and said third waveguide, which are symmetrically distributed on the periphery of said first magneto-optical cavity, are at an included angle of 120 DEG;

the axes of said first waveguide, said second waveguide and said third waveguide intersect at the center of said first magneto-optical cavity;

every two adjacent waveguides among said fourth waveguide, said fifth waveguide and said sixth waveguide which are symmetrically distributed on the periphery of said second magneto-optical cavity are at an included angle of 120 DEG; and the axes of said fourth waveguide, said fifth waveguide and said sixth waveguide intersect at the center of said second magneto-optical cavity.

6. The photonic crystal four-port circulator based on the coupling of said magneto-optical cavities according to claim 1, wherein said third waveguide and said fourth waveguide which are in a "v-shaped" arrangement have the same length;

and the included angle between said third and fourth waveguides is 120 DEG.

7. The photonic crystal four-port circulator based on the coupling of said magneto-optical cavities according to claim 3, wherein the cross sections of said first air columns, said second air columns, said third air columns, said fourth air columns, said fifth air columns, said sixth air columns and said two magneto-optical material columns in said photonic crystal can be circular, triangular, quadrilateral, pentagonal or hexagonal.

8. The photonic crystal four-port circulator based on the coupling of said magneto-optical cavities according to claim 2, wherein said first air columns, said second air columns, said third air columns, said fourth air columns, said fifth air columns and said sixth air columns in said photonic crystal are dielectric columns made of materials with a low refractive index.

9. The photonic crystal four-port circulator based on the coupling of said magneto-optical cavities according to claim 3, wherein gallium nitride material is selected as said background dielectric material of said photonic crystal, and bismuth iron garnet material is selected as said magneto-optical material for filling said first air columns.

* * * * *